(12) United States Patent
Jeon et al.

(10) Patent No.: US 7,584,421 B2
(45) Date of Patent: *Sep. 1, 2009

(54) ELECTRONIC DOCUMENT REQUEST/SUPPLY METHOD BASED ON XML

(75) Inventors: Hye Jeong Jeon, Seoul (KR); Kyoung Ro Yoon, Seoul (KR); Bae Geun Kang, Gyounggi-do (KR)

(73) Assignee: LG Electronics, Inc., Seoul (KR)

( * ) Notice: Subject to any disclaimer, the term of this patent is extended or adjusted under 35 U.S.C. 154(b) by 271 days.

This patent is subject to a terminal disclaimer.

(21) Appl. No.: 11/345,091

(22) Filed: Feb. 1, 2006

(65) Prior Publication Data

US 2006/0129918 A1    Jun. 15, 2006

Related U.S. Application Data

(63) Continuation of application No. 10/645,503, filed on Aug. 22, 2003, now Pat. No. 7,496,834.

(30) Foreign Application Priority Data

Oct. 15, 2002  (KR) ................ 62827/2002
Aug. 23, 2005  (KR) ................ 49966/2002

(51) Int. Cl.
  *G06F 17/00*    (2006.01)
(52) U.S. Cl. ..................... 715/234; 715/236
(58) Field of Classification Search ........... 715/200, 715/234, 236, 237, 240, 241
See application file for complete search history.

(56) References Cited

U.S. PATENT DOCUMENTS

| | | | |
|---|---|---|---|
| 4,847,902 A | 7/1989 | Hampson | |
| 5,499,365 A | 3/1996 | Anderson et al. | |
| 5,862,325 A | 1/1999 | Reed et al. | |
| 5,892,900 A | 4/1999 | Ginter et al. | |
| 6,088,717 A | 7/2000 | Reed et al. | |
| 6,185,329 B1 | 2/2001 | Zhang et al. | |

(Continued)

FOREIGN PATENT DOCUMENTS

EP    0 384 184    8/1990

(Continued)

OTHER PUBLICATIONS

J. Robie, "Combining Querying XML Data with SQL," Dec. 1999, from the Internet, pp. 1-14 http://www.infoloom.com/gcaconfs/WEB/philadelphia99/robie.HTM.

(Continued)

*Primary Examiner*—Stephen S Hong
*Assistant Examiner*—Gregory J Vaughn
(74) *Attorney, Agent, or Firm*—Sidley Austin LLP

(57) ABSTRACT

There is provided a method for requesting an electronic document based on XML in which the electronic document is created using a syntax defining a structure of a constructed electronic document. The electronic document request method can include creating a request document including an element name/attribute name based on a previously prescribed syntax without defining an additional syntax for requesting the electronic document, requesting a supply of the electronic document having an information on the element name/attribute name recorded in the request document, and receiving the electronic document including the information on the requested element name/attribute name.

34 Claims, 10 Drawing Sheets

U.S. PATENT DOCUMENTS

| | | | |
|---|---|---|---|
| 6,330,569 | B1 | 12/2001 | Baisley et al. |
| 6,473,794 | B1 | 10/2002 | Guheen et al. |
| 6,675,267 | B2 | 1/2004 | Rovati |
| 6,675,353 | B1 | 1/2004 | Friedman |
| 6,681,395 | B1* | 1/2004 | Nishi .......................... 725/45 |
| 6,760,746 | B1 | 7/2004 | Scheider |
| 6,847,977 | B2 | 1/2005 | Abajian |
| 6,873,693 | B1 | 3/2005 | Langseth et al. |
| 6,877,002 | B2 | 4/2005 | Prince |
| 6,904,454 | B2 | 6/2005 | Stickler |
| 6,912,529 | B1 | 6/2005 | Kolfman |
| 6,941,300 | B2 | 9/2005 | Jensen-Grey |
| 7,085,755 | B2 | 8/2006 | Bluhm et al. |
| 2002/0045951 | A1* | 4/2002 | Maesaka et al. ................. 700/1 |
| 2002/0059126 | A1* | 5/2002 | Ricciardi ..................... 705/36 |
| 2002/0092031 | A1 | 7/2002 | Dudkiewicz et al. |
| 2002/0100049 | A1* | 7/2002 | Yamato et al. ................. 725/47 |
| 2002/0122080 | A1* | 9/2002 | Kunii et al. .................. 345/864 |
| 2002/0126997 | A1* | 9/2002 | Kunii et al. .................... 386/95 |
| 2002/0143976 | A1 | 10/2002 | Barker et al. |
| 2002/0150387 | A1* | 10/2002 | Kunii et al. .................... 386/83 |
| 2002/0152244 | A1 | 10/2002 | Dean et al. |
| 2002/0156602 | A1* | 10/2002 | Kunii et al. ................. 702/188 |
| 2003/0009472 | A1 | 1/2003 | Azami et al. |
| 2003/0036395 | A1* | 2/2003 | Proidl ......................... 455/466 |
| 2003/0037181 | A1* | 2/2003 | Freed ......................... 709/328 |
| 2003/0074419 | A1* | 4/2003 | VanderDrift ................ 709/218 |
| 2003/0196165 | A1 | 10/2003 | Jung |
| 2003/0197733 | A1 | 10/2003 | Beauchamp et al. |
| 2003/0233241 | A1* | 12/2003 | Marsh ............................ 705/1 |
| 2004/0015369 | A1 | 1/2004 | Kim et al. |
| 2005/0193408 | A1 | 9/2005 | Sull et al. |
| 2005/0193425 | A1 | 9/2005 | Sull et al. |

FOREIGN PATENT DOCUMENTS

| | | |
|---|---|---|
| EP | 0384184 A2 | 8/1990 |
| EP | 1 126 707 A1 | 8/2001 |
| JP | 09-30522 | 11/1997 |
| JP | 9305622 | 11/1997 |
| JP | 2001186497 | 7/2001 |
| JP | 2001337833 | 12/2001 |
| JP | 2002-325236 | 11/2002 |
| KR | 1020020058639 A | 7/2002 |
| WO | WO9729591 | 8/1997 |
| WO | WO 01/52117 A2 | 7/2001 |
| WO | WO 01/55900 A1 | 8/2001 |
| WO | WO 01/95155 A2 | 12/2001 |
| WO | WO 02/27520 A1 | 4/2002 |
| WO | WO 02/063494 A2 | 8/2002 |
| WO | WO 02/073393 A1 | 9/2002 |
| WO | WO 2004/045209 A1 | 5/2004 |

OTHER PUBLICATIONS

Chinese Office Action for Chinese Application No. 03819565.8(PCT/KR2003/001705), dated Juned 22, 2007, 22 pages.

Korean Office Action for Korean Application No. 10-2003-0025093, dated Jan. 20, 2006, 2 pages.

European Search Report for Application No. EP 03811141, dated Oct. 10, 2005, 4 pages.

Hicks et al., "A Hypermedia Version Control Framework," ACM Transactions on Information Systems, vol. 16, No. 2, Apr. 1998, pp. 127-160.

Ramaswamy et al., "Automatic Detection of Fragments in Dynamically Generated Web Pages," ACM, 2004, pp. 443-454.

Chien et al., "Efficient Schemes for Managing Multiversion XML Documents," Dec. 19, 2002, Spring-Velag, pp. 332-353.

Chien et al., "XML Document Versioning," Sep. 2001, SIGMOD Record, vol. 30, No. 3, pp. 46-53.

Wong et al., "Managing and Querying Multi-Version XML Data with Update Logging," ACM, 2002, pp. 76-77.

European Search Report for European Application No. EP 03792872, dated Apr. 9, 2009, 3 pages.

Manuel Romero Salcedo et al., "Structured Cooperative Authoring for the World Wide Web," Computer Supported Cooperative Work: the Journal of Collaborative Computing, No. 6, 1997, pp. 157-174, XP002505136 NL.

* cited by examiner

Fig.3
Related Art

```
<?xml version="1.0" encoding="UTF-8"?>
<!ELEMENT Programs (Program+)>
<!ELEMENT Program (Title, ProgramID, Broadcast, Content?)>
<!ELEMENT Title (#PCDATA)>
<!ELEMENT ProgramID (#PCDATA)>
<!ELEMENT Broadcast (Time, Duration, Service?)>
<!ELEMENT Time (#PCDATA)>
<!ELEMENT Duration (#PCDATA)>
<!ELEMENT Service (#PCDATA)>
<!ELEMENT Content (Synopsis*, Casting*, Review*)>
<!ELEMENT Synopsis (#PCDATA)>
<!ELEMENT Casting (#PCDATA)>
<!ELEMENT Review (#PCDATA)>
```

Fig.4
Related Art

```xml
<?xml version="1.0" encoding="UTF-8"?>
<schema targetNamespace="http://www.tvguide.com"
        xmlns=http://www.w3c.org/2001/XMLSchema
        elementFromDefault="unquialified">
  <import namespace="http://www.w3c.org/XML/1998/namespace"
        schemaLocation="./xml-1998.xsd"/>

<element name="Programs">
    <complexType>
      <sequence>
        <element name="Program" maxOccurs="unbounded">
          <complexType>
            <sequence>
              <element name="Title"/>
              <element name="ProgramID"/>
              <element name="Broadcast">
                <complexType>
                  <sequence>
                    <element name="Time" type="dateTime"/>
                    <element name="Duration" type="dateTime"/>
                    <element name="Service" type="string" minOccur="0"/>
                  </sequence>
                </complexType>
              </element>
              <element name="Content" minOccur="0">
                <complexType>
                  <sequence>
                    <element name="Synopsis" type="string" minOccur="0" maxOccurs="unbounded"/>
                    <element name="Casting" type="string" minOccur="0" maxOccurs="unbounded"/>
                    <element name="Review" type="string" minOccur="0" maxOccurs="unbounded"/>
                  </sequence>
                </complexType>
              </element>
            </sequence>
          </complexType>
        </element>
      </sequence>
    </complexType>
  </element>
</schema>
```

Fig.5
Related Art

```
<?xml version="1.0" encoding="UTF-8"?>
<Programs>
  <Program>
    <Title>Friends</Title>
    <ProgramID>KTLA-2003-0509</ProgramID>
    <Broadcast>
       <Time>2003-05-09 19:00</Time>
       <Duration>30m</Duration>
       <Service>KTLA</Service>
    </Broadcast>
    <Content>
       <Synopsis>
It all begins when a pregnant Rachel (Jennifer Aniston) realizes that her dating days may be over after she gives birth. Hoping to lift her spirits, Joey (Matt LeBlanc) takes his blue roomie out for a night on the town, complete with flowers, dinner and some juicy revelations about their best "date moves." But once the pair part ways at evening's end, Joey is shaken by newfound feelings for his friend.
       </Synopsis>
    </Content>
  </Program>
</Programs>
```

Fig.6
Related Art

```
<?xml version="1.0" encoding="UTF-8"?>
<Programs>
  <Program>
    <Title>Sesame Street</Title>
    <ProgramID>KCET-2003-0509</ProgramID>
    <Broadcast>
      <Time>2003-05-09 12:00</Time>
      <Duration>60m</Duration>
      <Service>KCET</Service>
    </Broadcast>
    <Content>
      <Casting>Allison Bartlett O'Reilly</Casting>
      <Casting>Linda Bove</Casting>
      <Casting>Kristen Chenowith</Casting>
      <Casting>Emilio Delgado</Casting>
  </Program>
</Programs>
```

Fig.7

```
<?xml version="1.0" encoding="UTF-8"?>
<Programs>
  <Program>
    <ProgramID>KTLA-2003-0509</ProgramID>
    <Content>
      <Review></Review>
    </Content>
  </Program>
</Programs>
```

Fig.8

```
<?xml version="1.0" encoding="UTF-8"?>
<Programs>
  <Program>
    <Title>Friends</Title>
    <ProgramID>KTLA-2003-0509</ProgramID>
    <Broadcast>
      <Time>2003-05-09 19:00</Time>
      <Duration>30m</Duration>
      <Service>KTLA</Service>
    </Broadcast>
    <Content>
      <Synopsis>
```
It all begins when a pregnant Rachel (Jennifer Aniston) realizes that her dating days may be over after she gives birth. Hoping to lift her spirits, Joey (Matt LeBlanc) takes his blue roomie out for a night on the town, complete with flowers, dinner and some juicy revelations about their best "date moves." But once the pair part ways at evening's end, Joey is shaken by newfound feelings for his friend.
```
      </Synopsis>
      <Review>
```
Always best as a sparkling romantic comedy, Friends is funnier, sharper, sweeter and more satisfying than at any time since the early stages of Monica (Courteney Cox Arquette) and Chandler's (Matthew Perry) once-secret courtship.

Unquestionably, the revelation that Rachel (Jennifer Aniston) is pregnant by Ross (David Schwimmer) — an unexpected twist in a rocky relationship Ross recently described as "one heck of a see-saw" — has brought renewed comic vigor and heart to a show that a year ago was looking awfully worn out.

Of course, when a long-running series brings a baby on board, it's difficult to know if it will be seen as a blessed event or as the beginning of the end. In the case of Friends, maybe it's a little of both. ...
```
      </Review>
    </Content>
  </Program>
</Programs>
```

Fig.9

```
<?xml version="1.0" encoding="UTF-8"?>
<Programs>
  <Program>
    <Content>
      <Casting>Lisa Kudrow</Casting>
    </Content>
  </Program>
</Programs>
```

Fig. 10

```
<?xml version="1.0" encoding="UTF-8"?>
<Programs>
  <Program>
    <Title>Friends</Title>
    <ProgramID>KTLA-2003-0509</ProgramID>
    <Broadcast>
       <Time>2003-05-09 19:00</Time>
       <Duration>30m</Duration>
       <Service>KTLA</Service>
    </Broadcast>
    <Content>
       <Synopsis>
It all begins when a pregnant Rachel (Jennifer Aniston) realizes that her dating days may be over after she gives birth. Hoping to lift her spirits, Joey (Matt LeBlanc) takes his blue roomie out for a night on the town, complete with flowers, dinner and some juicy revelations about their best "date moves." But once the pair part ways at evening's end, Joey is shaken by newfound feelings for his friend.
       </Synopsis>
    </Content>
  </Program>
  <Program>
    <Title>Mother</Title>
    <ProgramID>KTLA-2003-0510</ProgramID>
    <Broadcast>
       <Time>2003-05-10 15:00</Time>
       <Duration>105m</Duration>
       <Service>PBS</Service>
    </Broadcast>
    <Content>
       <Synopsis>
Debbie Reynolds and writer-director Albert Brooks play a dysfunctional mother and son in this charming comedy from 1996.

Brooks stars as John Henderson, a neurotic, twice-divorced sci-fi writer who moves back home with his disapproving mom to get to the root of his problem with women. Arguments over food and spending habits soon arise, and Mom's house becomes a comic battlefield littered with subtle insults about John's writing. Reynolds' scene-stealing performance earned her a Golden Globe nomination for Best Actress. Rob Morrow stars as Brooks' younger brother.
       </Synopsis>
    </Content>
  </Program>
</Programs>
```

Fig. 11

```
<?xml version="1.0" encoding="UTF-8"?>
<Invalid>
  <Programs>
    <Program>
      <Title>Larry King</Title>
      <ProgramID>CNN-2003-0509</ProgramID>
      <Broadcast>
        <Time>2003-05-10 00:00</Time>
        <Duration>60m</Duration>
        <Service>CNN</Service>
      </Broadcast>
      <Content>
        <Synopsis> An interview series with the famed broadcaster.</Synopsis>
      </Content>
    </Program>
  </Programs>
</Invalid>
```

Fig. 12

```xml
<?xml version="1.0" encoding="UTF-8"?>
<Programs>
  <Program Invalid="true">
    <Title>Larry King</Title>
    <ProgramID>CNN-2003-0509</ProgramID>
    <Broadcast>
      <Time>2003-05-10 00:00</Time>
      <Duration>60m</Duration>
      <Service>CNN</Service>
    </Broadcast>
    <Content>
      <Synopsis> An interview series with the famed broadcaster.</Synopsis>
    </Content>
  </Program>
</Programs>
```

ELECTRONIC DOCUMENT REQUEST/SUPPLY METHOD BASED ON XML

CROSS REFERENCE TO RELATED APPLICATION

The present application is a continuation of co-pending application Ser. No. 10/645,503, filed Aug. 22, 2003, the entirety of which is incorporated by reference herein.

BACKGROUND OF THE INVENTION

1. Field of the Invention

The present invention relates to an electronic document request/supply method, and more particularly, to an XML-based electronic document request/supply method.

2. Background of the Related Art

In recent years, an extensible markup language (hereinafter, referred to as "XML") is widely used to create electronic documents. The utilization of XML increases rapidly throughout the world, and government and public offices as well as general enterprises are increasingly introducing the XML. These electronic documents are generally created on the basis of a syntax prescribed by each organization. Specific languages have been provided for searching XML documents.

However, related art methods for searching or requesting electronic documents have various disadvantages. In a related art method for requesting a supply of the electronic documents using these specific search languages, a user requesting the electronic document should learn an additional search language and-designate a structure of the XML document to be supplied as the search result. Accordingly, the related art methods are ineffective to the user who wants to request and receive the electronic document created based on the previously designated syntax.

Further, in case of using the document requested and supplied in the related art methods, the entire contents provided initially should be transmitted because there is no method of subsequent or additional notifications of contents deleted because of a change of document contents or notifications of invalid contents. The above references are incorporated by reference herein where appropriate for appropriate teachings of additional or alternative details, features and/or technical background.

SUMMARY OF THE INVENTION

An object of the invention is to solve at least the related art problems and/or disadvantages and to provide at least the advantages described hereinafter.

Another object of the present invention is to provide an electronic document request/supply method based on XML that substantially obviates one or more problems due to limitations and disadvantages of the related art.

Another object of the present invention to provide an electronic document request/supply method based on XML that retrieves an XML-based electronic document according to a specific syntax.

Another object of the present invention to provide an electronic document request/supply method based on XML in which the electronic documents are supplied using a previously prescribed syntax without learning or using the syntax of additional languages to request/supply the electronic document.

Another object of the present invention to provide an electronic document request/supply method based on. XML in which an electronic document application system utilized by a requester requests a search of the electronic document and processes the electronic document supplied from an electronic document repository using only a method or algorithm for processing a prescribed syntax.

Another object of the present invention is to provide an electronic document upgrade method based on XML in which a transmission efficiency is improved by transmitting selected contents or indications to update a previously supplied document.

Another object of the present invention is to provide an electronic document upgrade method based on XML in which a transmission efficiency is improved by transmitting only deleted, invalid or not currently valid contents among contents of a previously supplied document and not transmitting an entire previously supplied or deleted document.

To achieve at least the above-identified objects in a whole or in part according to the present invention, there is provided a method for requesting an electronic document based on XML, the electronic document being created using a syntax defining a structure of the electronic document, the method including creating a request document including an element name/attribute name based on a previously prescribed syntax without defining an additional syntax for requesting the electronic document, and requesting delivery of the electronic document having an information on the element name/attribute name recorded in the request document.

To further achieve at least the above-identified objects in a whole or in part according to the present invention, there is provided a method for supplying an electronic document based on XML, the electronic document including values of element name/attribute name contained in a request document, the request document being requested using a syntax defining a structure of the constructed electronic document, the method including providing an element name/attribute name based on a previously defined syntax in the request document among required elements, optional elements, required attributes or optional attributes, and selectively providing an identifier information in the request document identifying an information on the element name/attribute name, wherein at least one electronic document that is supplied is valid for the previously defined syntax and includes values of the element name/attribute name used in the request document, and wherein when the identifier information is provided the supplied electronic document satisfies the values of the element name/attribute name and an identifier value of the request document including a request information.

To further achieve at least the above-identified objects in a whole or in part according to the present invention, there is provided a method for supplying an electronic document based on XML using a syntax defining a structure of the electronic document, the method including supplying a document including an invalid element to delete subsequently invalid contents contained in a corresponding previously supplied document, wherein deletion of predetermined contents of the corresponding document is notified by adding to-be-deleted contents to the invalid element.

To further achieve at least the above-identified objects in a whole or in part according to the present invention, there is provided a method for supplying an electronic document based on XML using a syntax defining a structure of the electronic document, the method including deleting of predetermined contents of a corresponding document by supplying a subsequent document including an attribute identifying invalidity of the corresponding document to delete contents contained in the corresponding document.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is an exemplary view of a document type definition (DTD) showing a syntax of a broadcasting program produced by a related art method of creating an XML-based electronic document;

FIG. 4 is an exemplary view of an XML schema showing a syntax of a broadcasting program electronic document produced by a related art method of creating an XML-based electronic document;

FIGS. 5 and 6 are exemplary views of a broadcasting program electronic document produced by a related art method of creating an XML-based electronic document;

FIG. 7 is an exemplary view of a request document requesting a supply of an electronic document created by a preferred embodiment of an XML-based electronic document request method according to the present invention;

FIG. 8 is an exemplary view of an electronic document supplied according to the request document of FIG. 7;

FIG. 9 is another exemplary view of a request document requesting a supply of an electronic document created by a preferred embodiment of an XML-based electronic document request method according to the present invention;

FIG. 10 is an exemplary view of an electronic document supplied according to the request document of FIG. 9;

FIG. 11 is an exemplary view of providing information on a deleted document by supplying a document with an element name notifying an invalid document according to another preferred embodiment of an XML-based electronic document supply method according to the present invention; and FIG. 12 is an exemplary view of providing information on a deleted document by, supplying a document with an attribute name notifying an invalid document according to yet another preferred embodiment of an XML-based electronic document supply method according to the present invention.

DETAILED DESCRIPTION OF PREFERRED EMBODIMENTS

The XML-based electronic documents are often managed in a client/server structure that stores the documents in the server and provides desired electronic documents according to the user's request. Such a client/server structure is illustrated in FIG. 1.

Figure 1:
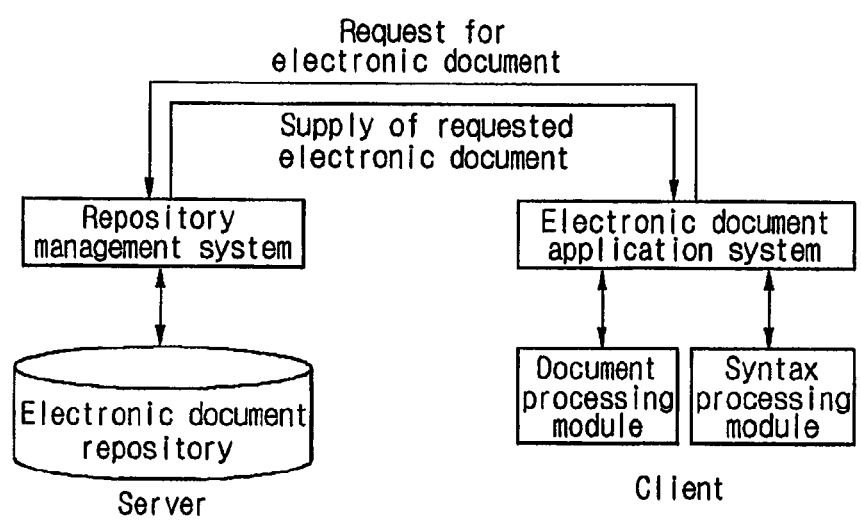
FIG. 1 is a schematic view of a related art client/server structure that requests/supplies a general XML-based electronic document.

FIG. 1 is a schematic view of the client/server structure that requests/supplies a general XML-based electronic document. As shown in FIG. 1, the client is a document requester/user side, and the server is a document provider side. Accordingly, if a system requesting and using a document has functions of storing and providing the document at the same time, the system can simultaneously act as the client and the server according to its role.

A language for searching these XML documents includes XML query language (XQL) and XQuery. These search languages ate widely used to search XML documents stored in an electronic document repository of the server and provide a result in a form of XML document desired by the requester.

As an example, the XQL will be described below. The XQL is a means for searching and selecting positions of data fields and texts existing within the XML document. The XML files are used to transmit data collection between computers on the web. The XQL provides a tool for searching or selecting a specific item in the data collection within the XML files. This is based on a format syntax that is used in an extensible style sheet language (XSL). The XQL is proposed as an extended version of the XSL.

For processing, the XSL format language uses a simple directory notation to indicate a specific element name. For example, "books/authors" represents "a searching of all author components within all book components in a specific context such as an XML file". The XQL adds a capacity of using Boolean logic, selecting components and indexing component collections to the directory format notation. The XQL makes it possible to produce programs capable of searching the electronic document repository, which stores the XML files, and providing hyperlinks linked to specific components.

As described above, in a related art method for requesting a supply of the electronic documents using these search languages, a user requesting the electronic document should learn, an additional search language and designate a structure of the XML document to be supplied as the search result. Accordingly, the related art XQL method is ineffective to the user who wants to request and receive the electronic document created based on the previously designated syntax.

Preferred embodiments of XML-based electronic document request methods using a prescribed syntax according to the present invention will now be described. XML-based electronic documents can use a document type definition (DTD) or an XML schema language to define syntaxes. These syntaxes define a structure of an entire electronic document and restrict name and occurrence frequency of each element, order, whether it is a required element or an optional element, attribute of each element, etc. The electronic documents become valid documents with respect to the syntaxes provided by these languages.

Preferred embodiments of the present invention can constitute a request document requesting desired information by using a prescribed syntax, and can request supply of information from an electronic document repository by using the request document. In other words, a requester requests the supply of the information to the electronic document repository by transmitting the request document or the like with the desired information recorded based on the prescribed syntax.

A request document is preferably constituted with only an element name/attribute name without detailed information values of element names/attribute names based on the syntax. Additionally, if there is an information that can limit the to-be-supplied information, an identifier or an element name/attribute name based on the syntax can be recorded in the request document together with specific values.

Accordingly, when the requester sends the request document to the electronic document repository for the purpose of requesting the supply of the electronic document, the syntax of a required element or a required attribute among the limitations of the prescribed syntaxes may not be observed. In other words, because the supply of the electronic document is requested to the repository after inserting only the desired element or the attribute values, the required element or the required attribute can be omitted if there is not the desired information value.

In the element name/attribute name representing the to-be-supplied information and having an identifier value or specific value for limiting the information, the electronic document described according to a hierarchy structure of the prescribed syntax is preferably used as the request document. The electronic document can be supplied that includes the value of the desired element name/attribute name and satisfies the value of the element name/attribute name used as the identification value or the conditions.

In other words, according to embodiments of the XML,-based electronic document request/supply method of the present invention, a supply of the electronic document having the corresponding information is requested by using a request document in which the identification value of the to-be-requested electronic document and the to-be-supplied element are described according to the hierarchy structure of the prescribed syntax.

Additionally, according to embodiments of the XML-based electronic document request/supply method of the present invention, an attribute value is added at the provider side to notify an invalidity of the contents to be deleted if contents of the supplied document are deleted or not valid any more. Further, according to embodiments of the XML-based electronic document request/supply method of the present invention, if predetermined contents of the supplied document are deleted or not valid any more, the invalidity of the document is preferably notified by inserting only the to-be-deleted contents into the element name.

The embodiments of a electronic document request/supply method according to the present invention can be applied, for example, to the requester requesting the supply of the electronic document, the provider supplying the requested electronic document, and a system configured with a network connecting the requester and the provider. Also, the electronic document request/supply method can be applied to a system that provides only basic information under an environment such as a broadcasting program providing system and then receives an additional information via a network according to the user's request.

Figure 2:
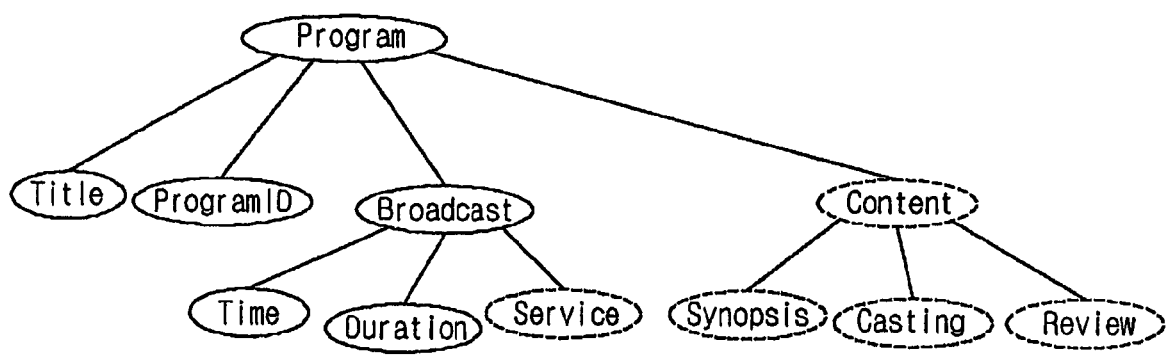
FIG. 2 is an exemplary view showing a syntax structure of a broadcasting program produced by a related art method of creating an XML-based electronic document.

For example, a syntax of the electronic document of the broadcasting program can be defined as follows, and an electronic document request/supply method will be described with reference to FIG. 2. FIG. 2 is an exemplary view showing a syntax structure of a broadcasting program produced by a related art method of creating an XML-based electronic document.

As shown in FIG. 2, it is assumed that the broadcasting program has a title and program identifier (ID) information uniquely indicating the program, an information on a broadcast such as broadcasting service, time and duration, and information on contents such as synopsis, review and casting. Herein, the case where the title, the program identifier, the time and the duration are defined as the required elements will be described. Accordingly, as shown in FIG. 2, a solid line can represent a required element and a dotted line can represent an optional element.

As shown in FIGS. 3 and 4, these programs can be illustrated using a DTD and an XML schema. FIG. 3 is an exemplary view of the DTD showing syntax of the broadcasting program produced by a related art method of creating the XML-based electronic document, and FIG. 4 is an exemplary view of the XML schema showing syntax of the broadcasting program created by a related method of creating the XML-based electronic document.

The DTD is regulations for applying XML in order to markup a specific document type and determined by its application. A definition of the document type can include an element type that can be expressed by the markup, an element relationship and attribute, and a regulation related to a reference.

In FIGS. 5 and 6, there are shown broadcasting programs actually created based on the syntax. FIGS. 5 and 6 are views of exemplary broadcasting program electronic documents created by a related art method of creating the XML-based electronic document. Here, the title that is the required element is all contained, but the optional elements may not be contained.

FIG. 7 is a diagram that shows an exemplary view of a request document requesting a supply of an electronic document created by the XML-based electronic document request method according to an embodiment of the present invention. It is assumed that the requester requests the review of a specific program to the broadcasting station. At this time, the requester can create the request document as shown in FIG. 7.

As shown in FIG. 7, the request document can use the same syntax of FIGS. 5 and 6. Although the present invention is not intended to be so limited. However, the title element that is the required element is omitted, and the supply of the electronic document is requested to the repository after inserting "the identifier" element of the desired program and "the review" element.

Accordingly, the request document can be supplied to the electronic document repository by the request of the user or the like who produces the request document shown in FIG. 7. FIG. 8 is a diagram that shows an exemplary view of the requested electronic document supplied according to the request document of FIG. 7. Further, as shown in FIG. 8, the electronic document including the requested information can be supplied to the electronic document application system utilized by the users according to the prescribed syntax.

As a further example, it is assumed that the requester requests programs in which a specific actor or actress performs. At this time, the requester can create the request document as shown in FIG. 9. As shown in FIG. 9, the request document can use the same syntax of FIGS. 5 and 6. However, the title element that is the required element is omitted, and the supply of the electronic document is requested to the repository after inserting only "the casting" element of the desired program. Here, since the "title" element and the information on "the broadcast" are the required elements, this information is automatically provided even if they are not marked in the request document.

Accordingly, as shown in FIG. 10, the electronic document repository supplies the electronic document application system utilized by the users with the electronic document including the requested information according to the prescribed syntax in response to the user's request.

According to the embodiments of XML-based electronic request/supply methods of the present invention, the requester can request a supply of the electronic document stored in the electronic document repository by using the prescribed syntax (e.g., without learning a syntax of the additional language for the search request). Additionally, embodiments of methods of the present invention can be performed more effectively since the electronic document supplied from the electronic document repository is processed by using only the system, which processes the prescribed syntax based on the XML.

At this time, the element name/attribute name of the request document is selectively recorded among the required/optional elements and/or the required/optional attributes for the syntax defining the constructed electronic document structure. The element name/attribute name selectively recorded in the request document can represent the document element name/attribute name of information that should be provided to the to-be-supplied electronic document. Further, if corresponding values are recorded in the element/attribute selectively recorded in the request document, the recorded values of the element name/attribute name represents the conditions of the element name/attribute name that should be satisfied by the electronic document provided in response to the user's request.

Further, if there are the contents to be deleted due to a change in the contents of the document, for example, if a prearranged broadcasting program is cancelled, the processes can be performed as shown in FIGS. 11 and/or FIG. 12. In other words, as shown in FIGS. 11 and 12, cancellation of the prearranged broadcasting program, for example, can be notified by adding an invalid or deletion element name or attribute name or the like.

FIG. 11 is a diagram that shows an exemplary view of an embodiment providing information on a deleted document by supplying a document with an element notifying that the document is invalid according to an embodiment of an XML-based electronic document supply method of the present invention. FIG. 12 is an exemplary view of providing information on a deleted document by supplying a document with an attribute notifying that the document is invalid according to another embodiment of an XML-based electronic document supply method of the present invention.

In more detail, information on the cancellation of a prearranged broadcasting program, for example "Larry King," can be provided by adding the invalid element as shown in FIG. 11. At this time, the to-be-deleted contents contained as the invalid contents within the supplied document can be determined by an identifier element that can identify the document. If the identifier element is supplied as the contents of the invalid element, the corresponding entire document can be deleted. If the identifier (e.g., identifier element) that can identify the corresponding document within the supplied document is contained and only the to-be-deleted contents of the corresponding document are contained as the invalid element name, only the corresponding contents contained within the invalid element name are preferably deleted.

Further, the information on the cancellation of the prescribed broadcasting program, for example "Larry King," can be provided simply by adding the attribute name <Program Invalid="true"> as exemplarily shown in FIG. 12. At this time, the attribute name notifying the invalidity of the supplied document can be an attribute of the identifier element name that can identify the to-be-deleted document. In case of providing the attribute name notifying that the attribute of the identifier element name becomes invalid, the corresponding entire document that can be identified by the corresponding document identifier is deleted.

Additionally, if the identifier that can identify the corresponding document within the supplied document is contained and only the to-be-deleted contents of the corresponding document are provided as an attribute notifying the invalidity, only the corresponding contents among the documents identified by the document identifier are preferably deleted.

According to embodiments of XML-based electronic document supply methods of the present invention, it is possible to gradually upgrade the document by deleting the contents, that are deleted or not valid any more because of a change in the contents of the document, without having to newly supply the document, or by supplying only the invalid contents.

As described above, preferred embodiments of methods for document request and/or supply have various advantages. According to preferred embodiments of the present invention, XML-based electronic documents can be effectively supplied using the previously prescribed syntax without learning the syntax of additional languages to request the electronic document. Further, an electronic document application system utilized by the requester can request the search of the electronic document and process the electronic document supplied from the electronic document repository using only an apparatus and/or algorithm for processing the prescribed syntax. In addition, if some or the entire contents of the supplied document are deleted or become invalid, the use of the invalid document or its contents can be reduced or prevented by simply notifying the deleted contents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method implemented by a client in a broadcasting system for managing metadata for multimedia program content scheduled for broadcast in the broadcasting system, the method comprising:

receiving in the client from a provider in the broadcasting system an electronic document containing metadata related to the scheduled multimedia program content, wherein the electronic document has a hierarchical structure based on a prescribed syntax and the hierarchical structure includes an upper fragment located above a lower fragment which is identified by a fragment identification;

requesting an update for the previously received lower fragment in the client; and in response to the request, receiving in the client an update document having a structure based on the prescribed syntax, the update document including the upper fragment and an invalid element, wherein the invalid element specifies that information in the previously received lower fragment is invalid.

2. The method of claim 1 comprising deleting the previously received lower fragment in response to receiving the invalid element.

3. The method of claim 1, wherein the invalid element specifies the fragment identification.

4. The method of claim 1, wherein the metadata includes at least one of title, synopsis, review, and cast for a scheduled broadcast program.

5. The method of claim 1, wherein the lower fragment is in XML format.

6. The method of claim 1, wherein the invalid element in the update document includes the information which is invalid in the previously received lower fragment.

7. The method of claim 1, wherein the invalid element includes a program identifier to identity the invalid information in the previously received lower fragment.

8. The method of claim 7, wherein the program identifier includes date information.

9. A method implemented by a provider in a broadcasting system for managing metadata for multimedia program content scheduled for broadcast in the broadcasting system, the method comprising:

receiving by the provider from a client device in the broadcasting system a request for updating a lower fragment containing metadata related to the scheduled multimedia program content, the client device storing the lower fragment in a previously received electronic document, wherein the electronic document has a hierarchical structure based on a prescribed syntax and the hierarchical structure includes an upper fragment located above the lower fragment which is identified by a fragment identification; and in response to the request, sending from the provider to the client device an update document having a structure based on the prescribed syntax, the update document including the upper fragment and an invalid element, wherein the invalid element specifies that information in the lower fragment is invalid.

10. The method of claim 9 wherein the lower fragment stored in the client device is deleted in response to the invalid element.

11. The method of claim 9 wherein the invalid element specifies the fragment identification.

12. The method of claim 9, wherein the metadata includes at least one of title, synopsis, review, and cast for a scheduled broadcast program.

13. The method of claim 9, wherein the lower fragment is in XML format.

14. A method implemented by a provider in a broadcasting system for updating metadata for multimedia program content scheduled for broadcast in the broadcasting system, the method comprising:

receiving by the provider from a client device in the broadcasting system a request for an updated lower fragment containing metadata related to the scheduled multimedia program content, the client device storing an earlier version of the lower fragment in a previously received electronic document, wherein the electronic document has a hierarchical structure based on a prescribed syntax and the hierarchical structure includes an upper fragment located above the lower fragment, and wherein the earlier version is identified by a version identifier; and in response to the request, sending from the provider to the client device an update document having a structure based on the prescribed syntax, the update document including the upper fragment and an invalid element, wherein the invalid element specifies the version identifier of the earlier version of the lower fragment and indicates that information in the lower fragment is invalid.

15. The method of claim 14, wherein the earlier version of the lower fragment stored in the client device is deleted in response to the invalid element.

16. The method of claim 14, wherein the version identifier is a numerical representation of a calendar date on which the earlier version was created.

17. The method of claim 14, wherein the version identifier is expressed in the form of YYYYMMDD, wherein YYYY, MM, and DD are numerical expressions of year, month, and day, respectively.

18. The method of claim 14, wherein the metadata includes at least one of title, synopsis, review, and cast for the scheduled multimedia program content.

19. The method of claim 14, wherein the lower fragment is in XML format.

20. A method implemented by a client in a broadcasting system for managing metadata for multimedia program content scheduled for broadcast in the broadcasting system, the method comprising:

receiving in the client from a provider in the broadcasting system a first version of an electronic document containing metadata related to the scheduled multimedia program content, wherein the electronic document has a hierarchical structure based on a prescribed syntax and the hierarchical structure includes an upper fragment located above a first version of a lower fragment, and wherein the first version of the lower fragment is identified by a version identifier;

storing the first version of the lower fragment in a local data structure of the client, wherein the local data structure is based on the prescribed syntax and corresponds to the electronic document;

requesting an update for the previously received lower fragment in the client; and in response to the request, receiving in the client an update document having a structure based on the prescribed syntax, the update document including the upper fragment and an invalid element, wherein the invalid element specifies the version identifier of the earlier version of the lower fragment.

21. The method of claim 20 comprising deleting the first version of the lower fragment in response to receiving the invalid element.

22. The method of claim 20, wherein the version identifier is a numerical representation of a calendar date on which the earlier version was created.

23. The method of claim 20, wherein the version identifier is expressed in the form of YYYYMMDD, wherein YYYY, MM, and DD are numerical expressions of year, month, and day, respectively.

24. The method of claim 20, wherein the metadata includes at least one of title, synopsis, review, and cast for the scheduled multimedia program content.

25. The method of claim 20, wherein the lower fragment is in XML format.

26. A method implemented by a provider in a broadcasting system for updating metadata related to multimedia program content scheduled for broadcast in the broadcasting system, the method comprising:

receiving by the provider a request from a client device in the broadcasting system for an updated version of a lower fragment in the metadata related to the scheduled multimedia program content, the client device storing an earlier version of the metadata, wherein the metadata has a hierarchical structure based on a prescribed syntax and the hierarchical structure includes an upper fragment above the lower fragment, and wherein the earlier version is identified by a version identifier; and in response to the request, sending from the provider to the client device an update document having a structure based on the prescribed syntax, the update document including the upper fragment and an invalid element, wherein the invalid element specifies that information in the lower fragment of the earlier version of the metadata is invalid.

27. The method of claim 26, wherein the lower fragment of the earlier version of the metadata stored in the client device is deleted in response to the invalid element.

28. The method of claim 26, wherein the version identifier is a numerical representation of a calendar date on which the earlier version was created.

29. The method of claim 26, wherein the version identifier is expressed in the form of YYYYMMDD, wherein YYYY, MM, and DD are numerical expressions of year, month, and day, respectively.

30. The method of claim 26, wherein the metadata includes at least one of title, synopsis, review, and cast for the scheduled multimedia program content.

31. A method implemented by a client in a broadcasting system for managing metadata for multimedia program content scheduled for broadcast in the broadcasting system, the method comprising:

receiving in the client from a provider in the broadcasting system an electronic document containing metadata related to the scheduled multimedia program content, wherein the electronic document has a hierarchical structure based on a prescribed syntax and the hierarchical structure includes an upper fragment located above a lower fragment which is identified by a fragment identification;

requesting an update for the previously received lower fragment in the client; and in response to the request, receiving in the client an update document having a structure based on the prescribed syntax, the update document including the upper fragment and an invalid attribute specifying that the previously received lower fragment is invalid.

32. The method of claim 31, wherein the update document includes information which is invalid in the previously received lower fragment.

33. A method implemented by a provider in a broadcasting system for managing metadata for multimedia program content scheduled for broadcast in the broadcasting system, the method comprising:

receiving by the provider from a client device in the broadcasting system a request for updating a lower fragment containing metadata related to the scheduled multimedia program content, the client device storing the lower fragment in a previously received electronic document, wherein the electronic document has a hierarchical structure based on a prescribed syntax and the hierarchical structure includes an upper fragment located above the lower fragment which is identified by a fragment identification; and in response to the request, sending from the provider to the client device an update document having a structure based on the prescribed syntax, the update document including the upper fragment and an invalid attribute specifying that the lower fragment is invalid.

34. The method of claim 33, wherein the update document includes information which is invalid in the previously received lower fragment.

\* \* \* \* \*